United States Patent
Negishi et al.

(10) Patent No.: US 9,158,756 B2
(45) Date of Patent: Oct. 13, 2015

(54) COMPUTER-IMPLEMENTED METHOD, PROGRAM, AND SYSTEM FOR IDENTIFYING NON-SELF-DESCRIPTIVE TERMS IN ELECTRONIC DOCUMENTS

(71) Applicant: International Business Machines Corporation, Armonk, NY (US)

(72) Inventors: Shiho Negishi, Tokyo (JP); Hironori Takeuchi, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 276 days.

(21) Appl. No.: 13/800,277

(22) Filed: Mar. 13, 2013

(65) Prior Publication Data

US 2013/0262088 A1  Oct. 3, 2013

(30) Foreign Application Priority Data

Mar. 30, 2012 (JP) ................................. 2012-078965

(51) Int. Cl.
G06F 17/27   (2006.01)
G06F 17/30   (2006.01)

(52) U.S. Cl.
CPC ...... *G06F 17/2735* (2013.01); *G06F 17/30734* (2013.01)

(58) Field of Classification Search
CPC ... G06F 17/3061; G06F 17/277; G06F 17/28; G06F 17/30719; G06F 17/2735; G06F 17/30734; Y10S 707/99939; Y10S 707/99935; G06Q 10/06393; G06Q 40/04
USPC ............... 704/9; 707/750, 783, 748, 999.005, 707/999.009; 705/37, 7.39
See application file for complete search history.

(56) References Cited

U.S. PATENT DOCUMENTS

| 6,421,669 | B1 * | 7/2002 | Gilmour et al. | 707/750 |
| 8,463,794 | B2 * | 6/2013 | Ikawa et al. | 707/748 |
| 2012/0253793 | A1 * | 10/2012 | Ghannam et al. | 704/9 |

FOREIGN PATENT DOCUMENTS

| JP | 3116374 A | 5/1991 |
| JP | 3286372 A | 12/1991 |

(Continued)

OTHER PUBLICATIONS

Gacitua et al. "On the Effectiveness of Abstraction Identification in Requirements Engineering", 18th IEEE International Requirements Engineering Conference, Dec. 2012, p. 5-14.

(Continued)

*Primary Examiner* — Charlotte M Baker
(74) *Attorney, Agent, or Firm* — F. Chau & Associates, LLC+

(57) ABSTRACT

A computer-implemented method, program, and system for identifying non-self-descriptive terms in electronic documents. The computer-implemented method for identifying a non-self-descriptive term in an electronic document, includes a memory and a processor communicatively coupled to the memory and configured to execute the steps of a method. The method includes acquiring a noun included in the corpus data. The method further includes calculating a qualifying level and a qualified level in the corpus data related to each known in the corpus data. The method further includes identifying one or more nouns included in the corpus data as having a qualifying level and/or qualified level satisfying a predetermined condition. The method further includes presenting a term related to one or more of the nouns in the electronic document as a candidate for the non-self-descriptive term in the electronic document.

17 Claims, 9 Drawing Sheets

(56) References Cited

FOREIGN PATENT DOCUMENTS

| JP | 2002269115 A | 9/2002 |
| JP | 2003099429 A | 4/2003 |
| JP | 2004038729 A | 2/2004 |

OTHER PUBLICATIONS

Sawyer et al. "Shallow Knowledge as an Aid to Deep Understanding in Early Phase Requirements Engineering", IEEE Trans. on Software Engineering, 31 (11), 2005, p. 969-981.

* cited by examiner

COMPUTER-IMPLEMENTED METHOD, PROGRAM, AND SYSTEM FOR IDENTIFYING NON-SELF-DESCRIPTIVE TERMS IN ELECTRONIC DOCUMENTS

CROSS-REFERENCE TO RELATED APPLICATION

This application claims priority under 35 U.S.C. §119 from Japanese Patent Application 2012-078965 filed on Mar. 30, 2012, the entire contents of which are incorporated herein by reference.

BACKRROUND OF THE INVENTION

1. Field of the Invention

The present invention is related to an information processing technique, and more particularly the present invention is related to a computer-implemented method, program, and system for identifying non-self-descriptive terms included in electronic documents.

2. Description of Related Art

For large-scale information processing systems in project development, certain industries such as banking and insurance, the definitions and meanings of related terms are agreed upon by stakeholders, which includes project members. Term dictionaries are created for shared use in these fields or projects. Once a term dictionary has been created, it is often necessary to maintain this term dictionary in response to new business, new functions, and legal and regulatory changes.

SUMMARY OF THE INVENTION

One aspect of the present invention provides a computer-implemented method for identifying a non-self-descriptive term in an electronic document, including a memory and a processor communicatively coupled to the memory and configured to execute the steps of a method. The method includes acquiring a noun included in the corpus data. The method further includes calculating a qualifying level and a qualified level in the corpus data related to each known in the corpus data. The method further includes identifying one or more nouns included in the corpus data as having a qualifying level and/or qualified level satisfying a predetermined condition. The method further includes presenting a term related to one or more of the nouns in the electronic document as a candidate for the non-self-descriptive term in the electronic document.

Another aspect of the present invention provides a computer readable non-transitory article of manufacture tangibly embodying computer readable instructions which, when executed, cause a computer to carry out the steps according of the method provided above.

Another aspect of the present invention provides a document processing system for identifying non-self-descriptive terms included in an electronic document which a memory and a processor communicatively coupled to the memory. The document processing system further includes a noun extraction unit for acquiring a noun included in corpus data. A qualification relationship analysis unit for calculating a qualifying level and a qualified level in the corpus data related to each noun that is included in the corpus data. A condition determining unit for identifying one or more nouns included in the corpus data having a qualifying level and/or qualified level satisfying a predetermined condition. An information processing unit for presenting a term related to one or more nouns in the electronic document as a candidate for the non-self-descriptive term in the electronic document.

The above-mentioned aspects of the present invention are not intended to enumerate all of the required features of the present invention, and it is to be understood that the present invention includes all combinations and sub-combinations of these constituent elements.

DETAILED DESCRIPTION OF THE PREFERRED EMBODIMENT

Figure 1:
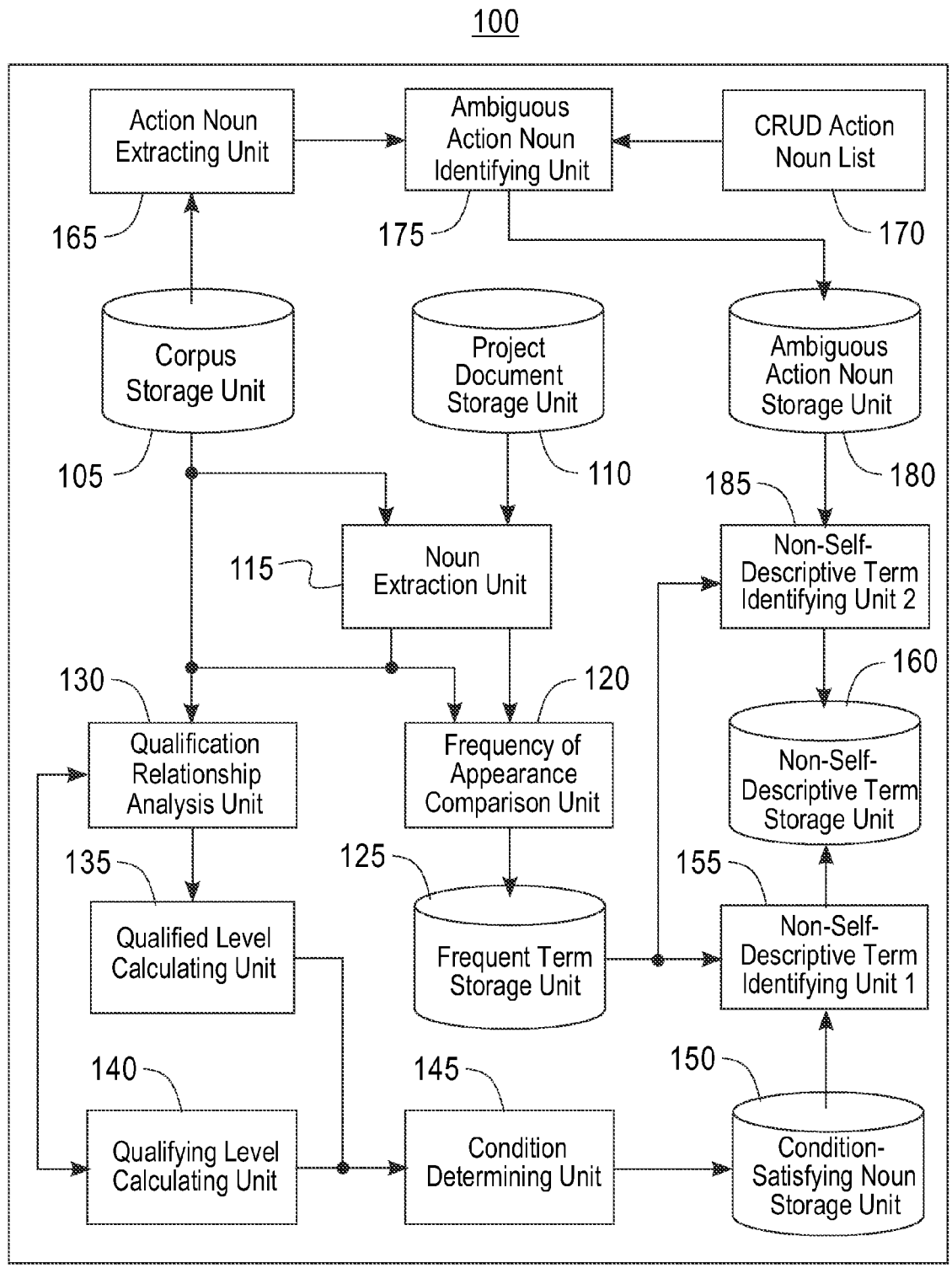
FIG. 1 is a functional block diagram of the document processing system in an embodiment of the present invention.

The terms used in electronic documents are often ambiguous. The terms meanings and definitions are difficult or impossible for a person of ordinary skill in the art to understand based on the expressions using these terms (referred to as "non-self-descriptive terms" herein). Therefore, stakeholders have to work together to clearly define the meanings of these non-self-descriptive terms. It is difficult to maintain all terms related to a project from a cost standpoint therefore non-self-descriptive terms often have to be identified and prioritized for maintenance. A purpose of the present invention is to meet this demand by providing an improved computer-implemented method, program and system for effectively identifying non-self-descriptive terms.

An embodiment of the present invention will now be explained in detail with reference to the drawings. However, the present invention as described in the scope of the claims is not limited to the following embodiment, and all combinations of features explained in the embodiment are not necessarily essential to the technical solution of the present invention.

The present invention can be embodied in different ways, and should not be construed as limited to the content of the embodiments described below. The same elements are denoted by the same numbers throughout the entire explanation of the present invention.

In the embodiment of the present invention, candidates for non-self-descriptive terms included in one or more electronic documents are presented via information processing performed in a document processing system. In the embodiment of the present invention, electronic project documents are created and stored in a document processing system for a project to develop an information processing system for processing prescribed tasks.

In the embodiment of the present invention, the information processing system identifies and presents candidates for "non-self-descriptive terms" among the terms included in a target project document. It is assumed that a person or device will eventually identify the non-self-descriptive terms among the candidates for non-self-descriptive terms, and that the identified non-self-descriptive terms will be given precedence in the maintenance of a term dictionary so that misunderstandings and conflicts do not occur between stakeholders, which includes project members.

In the embodiment of the present invention, the project members prepare the corpus data and the data in the target project documents for the document processing system. The corpus data can be, for example, a large quantity (tens of thousands) of newspaper articles. Morphological analysis and dependency analysis are performed on the corpus data and the project documents, and nouns (including compound nouns) are extracted on the basis of frequency of appearance.

Next, the frequency of appearance of nouns included in the project documents are compared to the frequency of appearance in the corpus data, and nouns with a high frequency of appearance in the project documents are identified as nouns frequently appearing in the project documents (referred to as "frequent terms" herein). It is assumed that frequent terms are words that are used especially in project documents, and that have to be given precedence in the creation and maintenance of a term dictionary.

In the embodiment of the present invention, a document management system breaks down compound nouns included in the corpus data into the simple nouns constituting the compound nouns. Then, the document management system analyzes the qualification relationships of the simple nouns included in the corpus data and the simple nouns obtained by breaking down the compound nouns included in the corpus data. Specifically, the words qualifying each simple noun and the words qualified by each simple noun are identified in this analysis.

In the embodiment of the present invention, (1) the "qualified level" represents the degree to which a noun has been qualified, and (2) the "qualifying level" represents the degree to which a noun qualifies other words that are calculated for each noun on the basis of the results from the qualification relationship analysis. Nouns which satisfy predetermined conditions, that is, whose "qualified level" and "qualifying level" exceed a predetermined threshold value, are identified.

In the embodiment of the present invention, terms related to a noun satisfying the predetermined conditions, more specifically, terms in which the noun serves as a beginning term or an end term, are identified as a first type of non-self-descriptive term among the nouns identified as frequent terms in a project document.

In the embodiment of the present invention, candidates for other types of non-self-descriptive terms are identified. More specifically, linked nouns representing a predetermined action (referred to as "verbal nouns" herein) are extracted. The extracted linked identifies verbal nouns, which is a verbal noun used together with a previously defined CRUD verbal noun. CRUD is a scheme of basic actions performed by an information processing system, including "create", "read", "update", and "delete". These are used frequently in the specifications of information processing systems.

Thereafter, nouns including verbal nouns identified in a target project document are identified as candidates for a second type of non-self-descriptive term. It is assumed that groups of candidates for first and second non-self-descriptive terms are presented to a user, and that these groups are used to maintain a dictionary of terms used in a project related to the target document.

FIG. 1 is a functional block diagram of the document processing system (100) in the embodiment of the present invention. In an information processing device, with a hardware configuration shown in FIG. 5, computer programs such as an operating system and application programs stored in a hard disk drive 13 are loaded into a main memory 4, where they are read to the CPU 1 to get hardware and software resources to work together to realize each element as shown in FIG. 1.

In reference to FIG. 1, the document processing system (100) includes a corpus storage unit (105) and a project document storage unit (110). The corpus storage unit stores corpus data, which is a large-scale integration of sentences in natural language. More specifically, data from tens of thousands of newspaper articles has been obtained as corpus data, but it is not limited to this. The project document storage unit (110) stores electronic documents created in relation to project development for an information processing system. The documents stored in the project document storage unit (110) include external specifications and internal specifications for an information processing system, contracts such as service-level agreements (SLAs), project minutes, and email correspondence. However, the documents are not limited to these.

In the embodiment of the present invention, the document processing system (100) includes a noun extraction unit (115), a frequency of appearance comparison unit (120), and a frequent term storage unit (125). The noun extraction unit (115) includes a function which conducts a morphological analysis of corpus data stored in the corpus storage unit (105) or project documents stored in the project document storage unit (110), and extracts nouns (including compound nouns). The noun extraction unit (115) can break down compound nouns extracted from the corpus data into the simple nouns included in the compound nouns. The noun extraction unit (115) can also calculate the frequency of appearance of a noun in a given document (that is, the percentage of the noun relative to the entire document). In the embodiment of the present invention, the frequency of appearance is preferably calculated by dividing the number of appearances of a noun in a given document by the total number of simple nouns included in the document.

For each noun extracted from a project document, the frequency of appearance comparison unit (120) compares the frequency of appearance in the project document to the frequency of appearance in the corpus data. When it has been determined that the frequency of appearance in the project document exceeds a predetermined reference (for example, 3×), the noun is identified as a frequent term in the project document. The frequent term storage unit (125) stores the frequent terms identified by the frequency of appearance comparison unit (120).

The document processing system (100) in the embodiment of the present invention also includes a qualification relationship analysis unit (130), qualified level calculating unit (135), qualifying level calculating unit (140), condition determining unit (145), and condition-satisfying noun storage unit (150). The qualification relationship analysis unit (130) analyzes the qualification relationships related to the nouns included in the corpus data. More specifically, the words qualifying each noun and the words qualified by each noun included in the corpus data are identified in this analysis. In the embodiment of the present invention, the simple nouns extracted from the corpus data and the simple nouns obtained by breaking down compound nouns extracted from the corpus data are the targets of analysis.

The qualified level calculating unit (135) calculates whether or not a target noun is qualified by some other adjective or noun. The qualifying level calculating unit (140) calculates whether or not a target noun qualifies another word. The condition determining unit (145) determines whether or not the qualified level and qualifying level calculated by the qualified level calculating unit (135) and the qualifying level calculating unit (140) have satisfied a predetermined condition. In the embodiment of the present invention, the predetermined condition is that the qualified level and the qualifying level are both equal to or greater than a predetermined threshold value (for example, 0.7). The condition-satisfying noun storage unit (150) stores the nouns determined by the condition determining unit (145) to have satisfied the predetermined condition.

In the present invention, referring to FIG. 1, the document processing system (100) includes a first non-self-descriptive term identifying unit (155) and a non-self-descriptive term storage unit (160). The first non-self-descriptive term identifying unit (155) identifies a frequent term stored in the frequent term storage unit (125) as a candidate for a first type of non-self-descriptive term when the frequent term satisfies a predetermined relationship with nouns stored in the condition-satisfying noun storage unit (150). In the embodiment of the present invention, the predetermined relationship is that a noun stored in the condition-satisfying noun storage unit (150) is a beginning term or an end term for the frequent term. The non-self-descriptive term storage unit (160) stores candidates for non-self-descriptive terms identified by the first non-self-descriptive term identifying unit (155).

The document processing system (100) in the embodiment of the present invention also includes a verbal noun extracting unit (165), a CRUD verbal noun list (170), an ambiguous verbal noun identifying unit (175), an ambiguous verbal noun storage unit (180), and a second non-self-descriptive term identifying unit (185). The verbal noun extracting unit (165) extracts "verbal nouns" or nouns representing a predetermined action from the corpus data. The verbal noun extracting unit (165) extracts the linked verbal nouns. The CRUD verbal noun list (170) is a list of previously defined CRUD verbal nouns. As mentioned earlier, CRUD is a scheme of basic actions performed by an information processing system, including "create", "read", "update", and "delete". These are used frequently in the specifications of information processing systems.

In the embodiment of the present invention, the CRUD verbal noun list used in Japanese-language corpus data and target documents includes the following 31 words.

Noun List For CRUD Functions in Japanese-Language Documents
 sakusei
 seisei
 hassei
 teigi
 insutōru
 fuka
 tsuika
 sanshō
 nyūryoku
 yomikomi
 kopī
 henkō
 setto
 kōshin
 henshū
 henkan
 sanshutsu
 shōryaku
 han'ei
 kansei
 shōnin
 shōkyo
 sakujo
 kaijo
 kaihō
 kyanseru
 kaihō
 kuria
 shōkyo
 haki
 kinyū

In the embodiment of the present invention, the CRUD verbal noun list used in English-language corpus data and target documents includes the following 31 words.

Noun List For CRUD Functions in English-Language Documents
 creation
 construction
 generation
 installation
 reinstallation
 deletion
 cancellation
 input
 update
 modification
 rejection
 change
 close
 record
 set
 reset
 fix
 display
 show
 load
 run
 initiation
 read
 refresh
 output
 collection
 import
 accept
 export
 insertion
 enter The ambiguous verbal noun identifying unit (175) identifies verbal nouns included in the corpus data that are used together with verbal nouns included in the CRUD verbal noun list on the basis of the linked verbal noun information included in the corpus data and extracted by the verbal noun extracting unit (165). For convenience the identified verbal nouns are referred to herein as "vague verbal nouns". The ambiguous verbal noun storage unit (180) stores the "ambiguous verbal nouns" identified by the ambiguous verbal noun identifying unit (175). The second non-self-descriptive term identifying unit (185) identifies ambiguous verbal nouns stored in the ambiguous verbal noun storage unit (180) as candidates for a second type of non-self-descriptive term. The identified candidates for non-self-descriptive terms are stored in the non-self-descriptive term storage unit (160). The groups of first and second non-self-descriptive term candidates stored in the non-self-descriptive term storage unit (160) are presented to the user for use in maintaining the dictionary of terms used in the project related to the target document.

In a further embodiment of the present invention the method includes a step for analyzing the qualification relationships of each noun included in the corpus data. Preferably, the analyzing step includes a step for identifying words qualifying and words qualified by each noun included in the corpus data.

In a further embodiment of the present invention, the method includes a step for breaking down compound nouns included in the corpus data into the simple nouns constituting the compound nouns, the analyzing step including a step for analyzing the qualification relationships of each simple noun acquired by the analyzing step.

Preferably, in a further embodiment of the present invention the terms are frequent terms having a frequency of appearance in the electronic document greater than a predetermined reference. Preferably, the method further includes the steps of: calculating the frequency of appearance of a noun included in the corpus data; calculating the frequency of appearance of a noun included in the electronic document; and identifying as a frequent term a noun if the frequency of appearance of a noun included in the electronic document is greater than a predetermined reference in comparison to the frequency of appearance of the noun in the corpus data. The frequency of appearance of a noun is calculated by dividing the number of appearances of a noun in electronic data by the total number of nouns included in the electronic data.

Preferably, the qualified level of a noun is calculated by dividing the number of places the noun is qualified by other words and phrases in accordance with a predetermined pattern by the total number of appearances of the noun. Preferably, the qualifying level of a noun is calculated by dividing the number of places the noun qualifies another word in accordance with a predetermined pattern by the total number of appearances of the noun.

Preferably, it is determined that the predetermined condition is satisfied on condition that the qualified level and qualifying level exceed a predetermined threshold value.

Preferably, the presenting step includes a step for identifying as a candidate for a non-self-descriptive term a term including one or more nouns as a beginning term or an end term.

Preferably, the electronic document is a project document related to an information processing system. Preferably, the method also includes the steps of: acquiring a verbal noun included in the corpus data; identifying a verbal noun included in the corpus data used on the basis of a verbal noun included in the corpus data expressing a basic action of the information processing system determined beforehand; and identifying a term including the identified verbal noun as a non-self-descriptive term. Preferably, the basic action of the information processing system includes CRUD (create, read, update and delete).

Preferably, the acquiring step includes a step for conducting a morphological analysis of the corpus data and extracting nouns.

The overview of the present invention described above is for a computer-implemented method which identifies non-self-descriptive terms included in an electronic document. However, the present invention can also be understood as a program, program product, software, software product, system, or device.

The program product or software product can include a storage medium for storing the program or software, or a medium for transmitting the program or software. The program enables a computer to execute the steps in the method described above.

Figure 2:
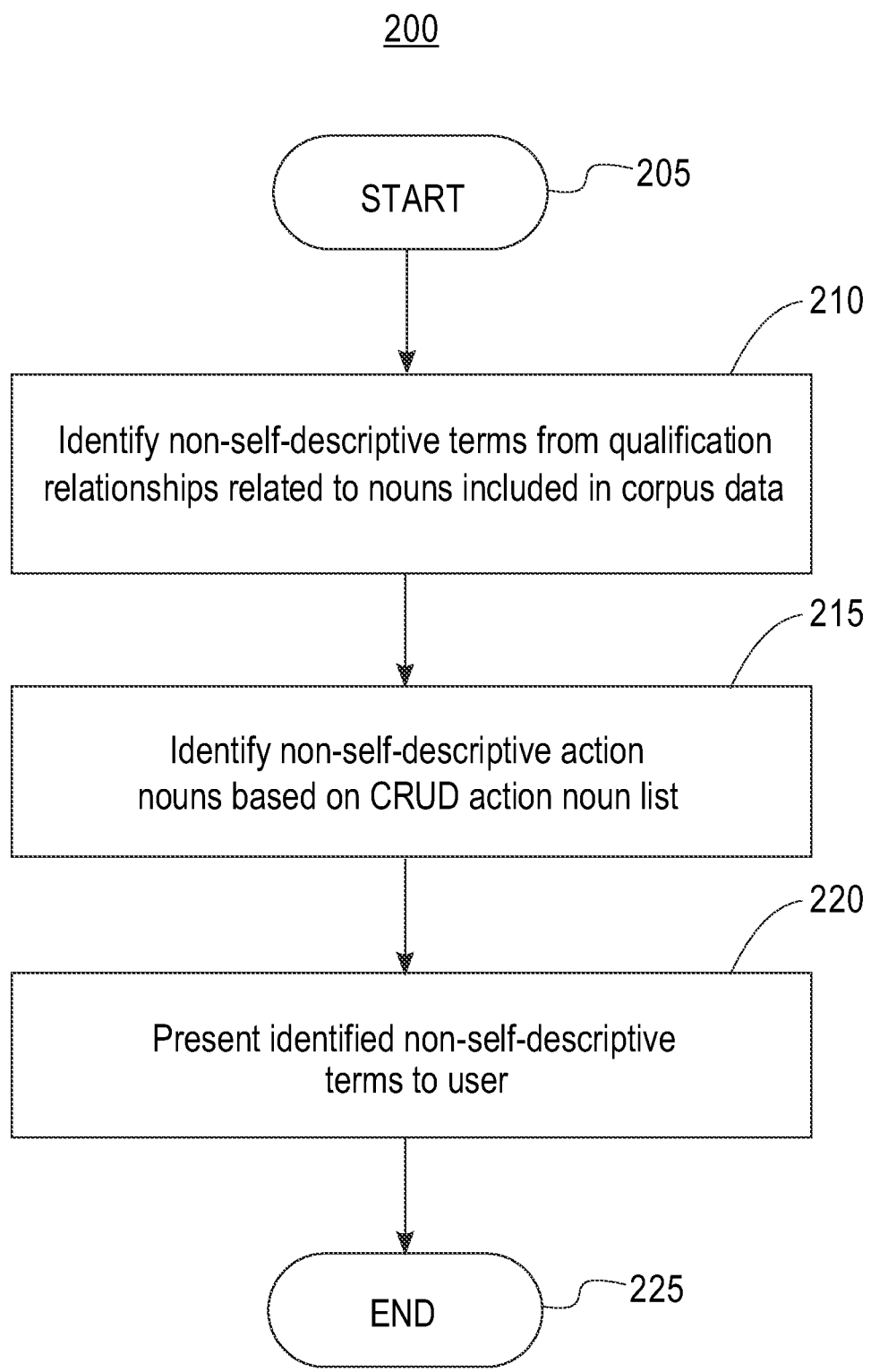
FIG. 2 is a flowchart representing all of the operations performed by the document processing system in the embodiment of the present invention.

In a further embodiment of the present invention, referring to FIG. 2, is a flowchart (200) that represents all of the operations performed by the document processing system. In Step (205), the process is started. In Step (210), the candidates for the first type of non-self-descriptive terms are identified from the qualification relationships with nouns included in the corpus data. Next, the process proceeds to Step (215) where the second type of non-self-descriptive terms are identified on the basis of the CRUD verbal noun list. In Step (220), the identified non-self-descriptive candidates are presented to the user. In Step (225), the process ends. Step (210) and Step (215) are explained in detail below using the flowcharts in FIG. 3 and FIG. 4. Note that each step in the flowcharts shown in FIG. 3 and FIG. 4 is executed by the document processing system 100 using the function blocks corresponding to those explained in reference to FIG. 1.

Figure 3:
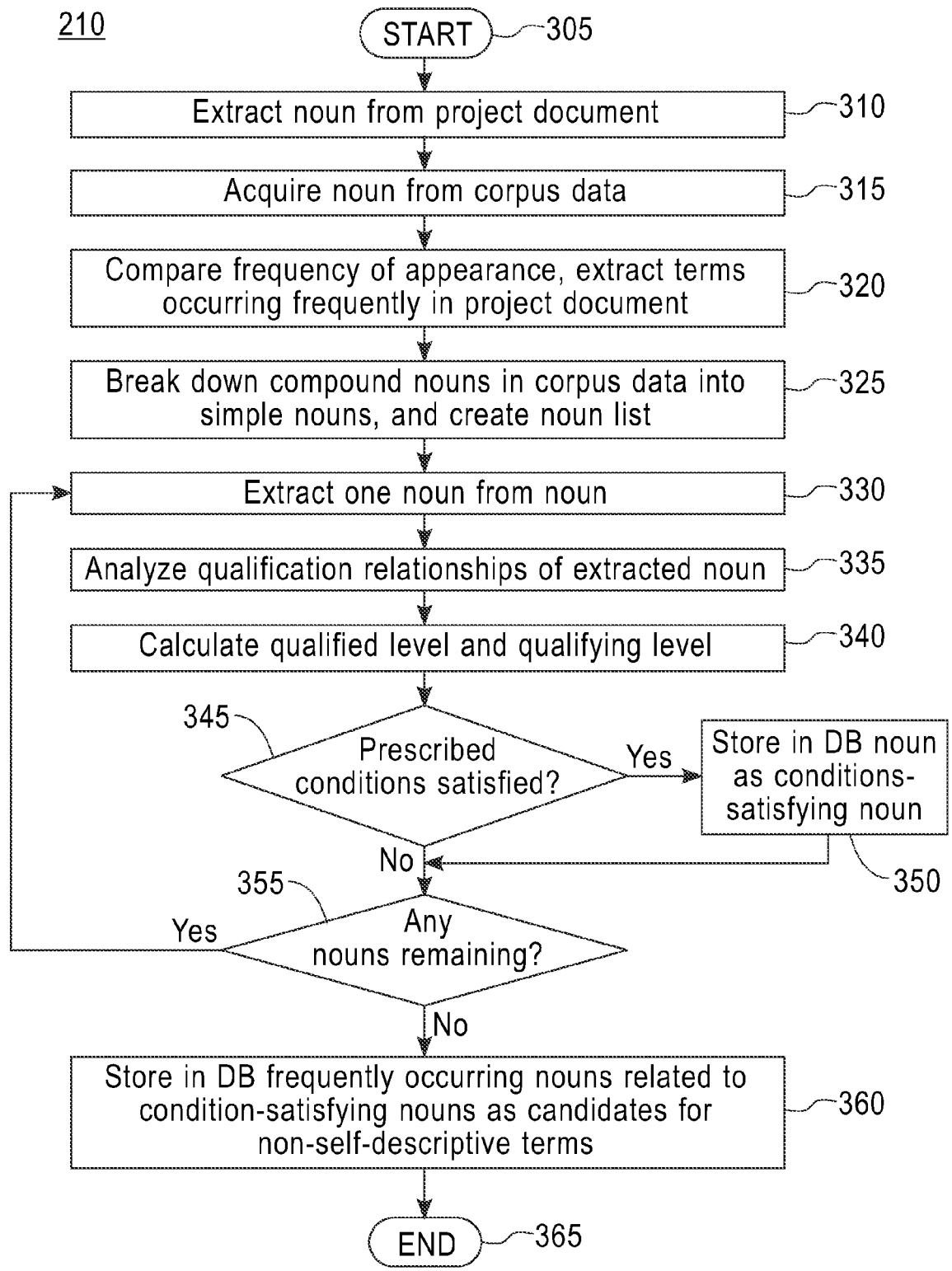
FIG. 3 is a flowchart representing the specific operations related to candidates for non-self-descriptive terms based on the qualification relationships of a noun as performed by the document processing system in a further embodiment of the present invention.
Figure 4:
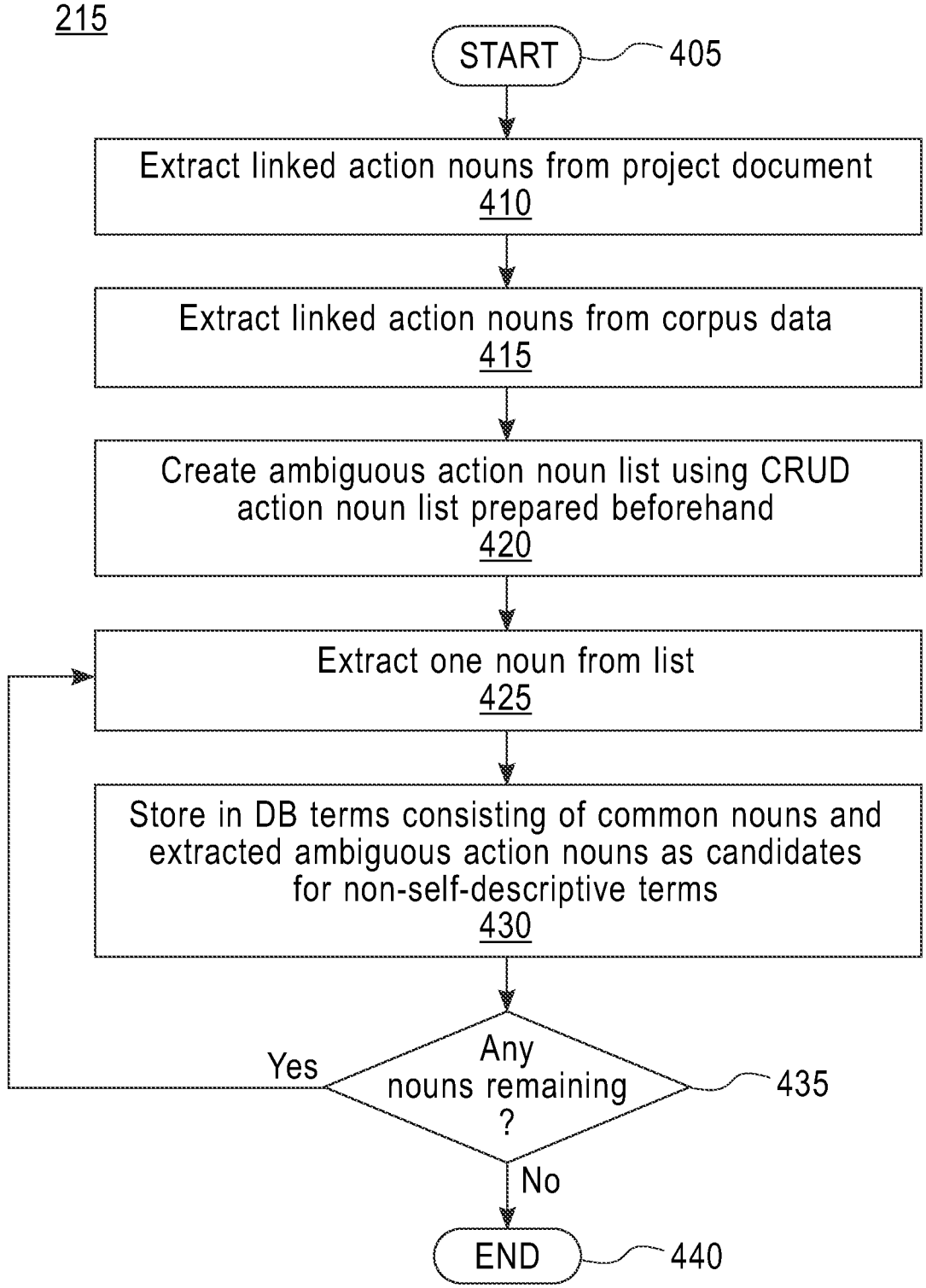
FIG. 4 is a flowchart representing the specific operations related to candidates for non-self-descriptive terms based on a CRUD verbal noun list as performed by the document processing system in a further embodiment of the present invention.

The flowchart shown in FIG. 3 is an example of identifying candidates for non-self-descriptive terms on the basis of the qualification relationships of Step (210) of FIG. 2. In Step (305), the process starts. In Step (310), a morphological analysis is conducted on a project document, and nouns are extracted and acquired. The nouns extracted in Step (210) include compound nouns with two or more simple nouns (for example, "customer data" consisting of two simple nouns "custom" and "data").The frequency of the appearance of each acquired noun is stored. Next, in Step (215), a morphological analysis is conducted on the corpus data, and the nouns (including compound nouns) are extracted and acquired. In Step (215) the frequency of the appearance of each acquired noun is stored.

Referring to FIG. 3, in Step (320), the frequency of appearance of the nouns in the project document acquired in Step (310) is compared to the frequency of appearance of the nouns in the corpus data. The nouns whose frequency of appearance in the project document is greater than a predetermined reference (for example, 3x) are identified as frequent terms in the project document. In the embodiment of the present invention, the identified frequent terms are stored in the frequent term storage unit (125).

The process proceeds to Step (325) where the complex nouns among the nouns included in the corpus data are broken down to obtain simple nouns. The simple nouns acquired from the breakdown and the simple nouns originally extracted from the corpus data are merged to generate a noun list. Next, in Step (330), one noun is taken from the noun list generated in Step (325).

The process proceeds to Step (335) where the qualification relationships of the noun taken from the noun list in Step (330) are analyzed. More specifically, the words qualifying the noun and the words qualified by the noun taken from the noun list are identified in this analysis. Next, in Step (340), (1) the "qualified level" represents the degree to which a noun has been qualified, and (2) the "qualifying level" represents the degree to which a noun qualifies other words are calculated on the basis of the results from the analysis in Step (335).

Figure 6:
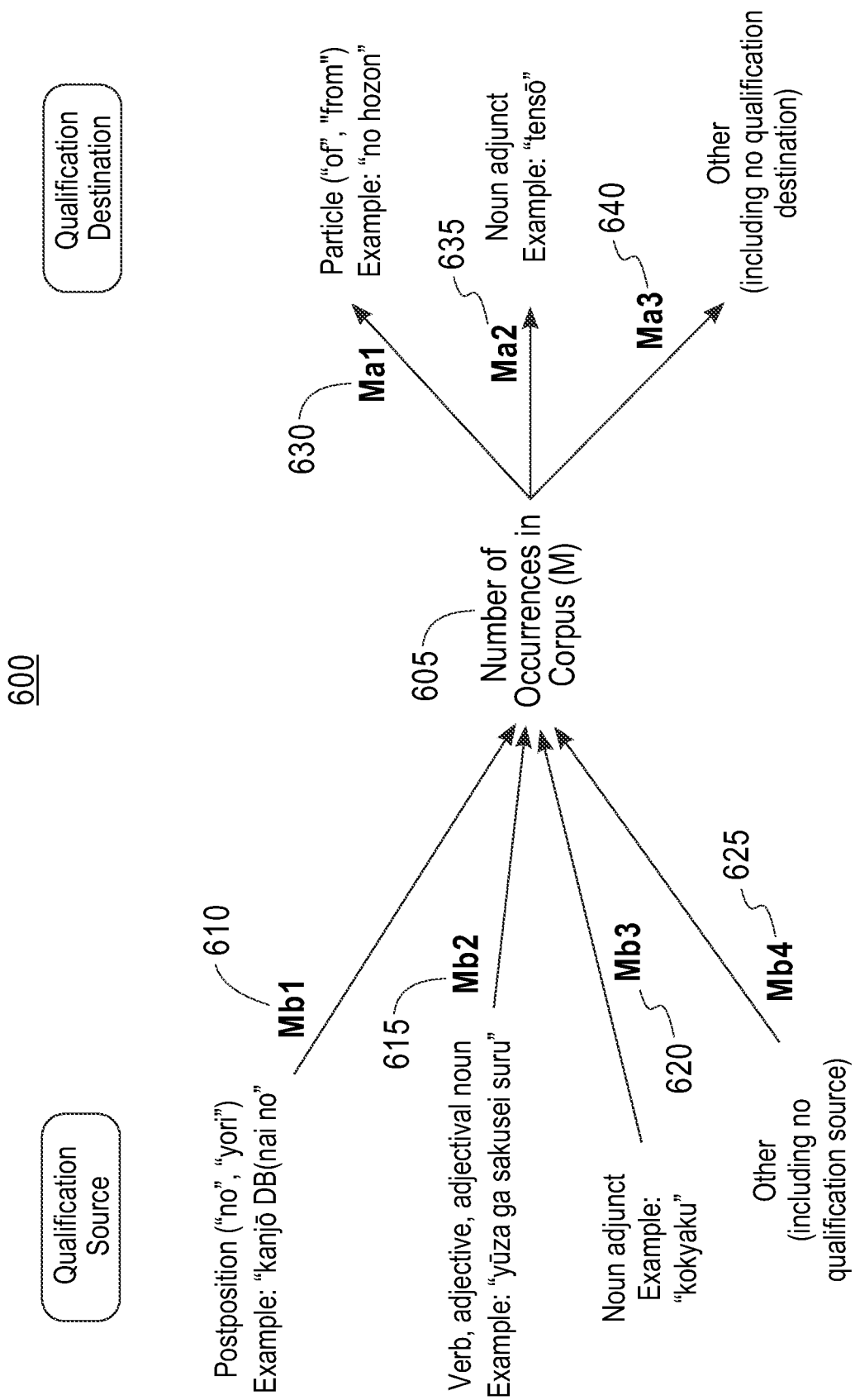
FIG. 6 is a diagram used to explain the process for calculating the "qualified level" and the "qualifying level" on Japanese-language corpus data in a further embodiment of the present invention.

The "qualified level" and "qualifying level" calculations performed on Japanese-language corpus data will be explained in detail using FIG. 6. In the embodiment of the present invention as shown in FIG. 6, (600), the "qualified level" and "qualifying level" calculations are performed on the word "dēta" used in the corpus data. First, the number of occurrences M (605) of the noun "dēta" in the corpus data is counted.

Furthermore, referring to FIG. 6, in order to calculate the "qualified level" of the word "dēta", the number of times Mb1 (610) the word "dēta" is qualified in the corpus data by a postposition ("no", "yori", etc.) is counted. For example, the expression "Kanjō DB-nai no dēta" is counted in Mb1.

Also, the number of times Mb2 (615) the word "dēta" is qualified in the corpus data by a verb, adjective or adjectival noun is counted. For example, the expression "yūza ga sakusei suru dēta" is counted in Mb2. Also, the number of times Mb3 (620) the word "dēta" is qualified in the corpus data by a noun adjunct is counted. For example, the expression "kokyaku dēta" is counted in Mb3. The word "dēta" in all other qualification patterns (including the unqualified use of the word "dēta") is counted in Mb4 (625).

In a further embodiment of the present invention, the "qualified level S1" is calculated in accordance with the following equation on the basis of M, Mb1, Mb2 and Mb3 counted in the manner described below.

Qualified Level $S1=(Mb1+Mb2+Mb3)/M$

In the embodiment of the present invention, in order to calculate the "qualifying level" of the word "dēta", the number of times Ma1 (630) the word "dēta" qualifies another word in the corpus data via a postposition ("no", "yori", etc.) is counted. For example, the expression "dēta no hozon" is counted in Ma1. Also, the number of times Ma2 (635) the word "dēta" qualifies another noun in the corpus data via a noun adjunct of the word "dēta" and another noun is counted. For example, the expression "dēta tensō" is counted in Ma2. All other qualification patterns with the word "dēta" (including situations in which the word "dēta" does not qualify another word) are counted in Ma3 (640).

In a further embodiment of the present invention, the "qualifying level S2" is calculated in accordance with the following equation on the basis of M, Ma1 and Ma2 counted in the manner described below.

Qualifying Level $S2=(Ma1+Ma2)/M$

Figure 7:
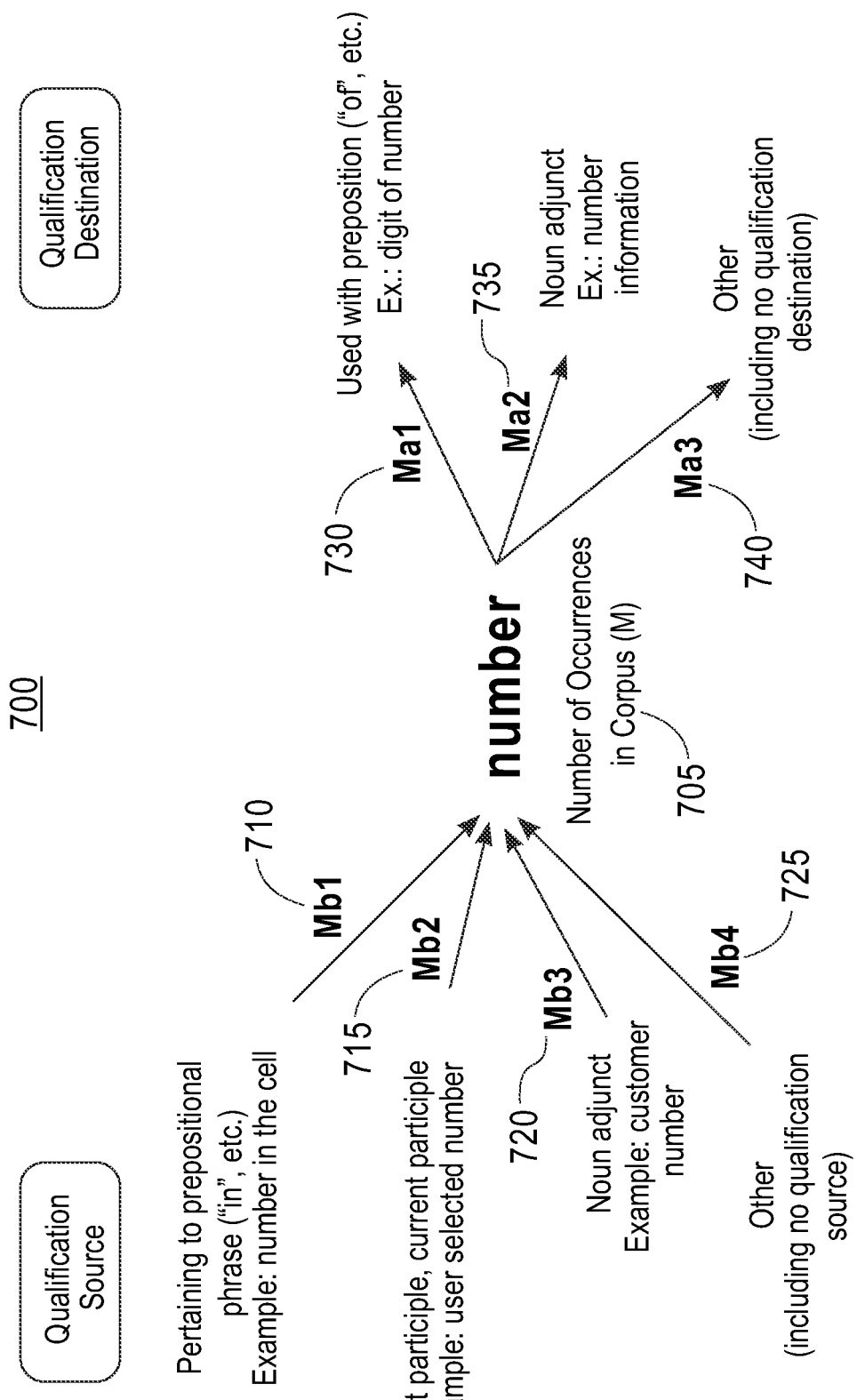
FIG. 7 is a diagram used to explain the process for calculating the "qualified level" and the "qualifying level" on English-language corpus data in a further embodiment of the present invention.

In a further embodiment of the present invention, the "qualified level" and "qualifying level" calculations performed on English-language corpus data in Step (340) will be explained in detail using FIG. 7. Referring to FIG. 7, (700), the "qualified level" and "qualifying level" calculations are performed on the word "number" used in the corpus data. First, the number of occurrences M (705) of the noun "number" in the corpus data is counted.

Second, referring to FIG. 7 in order to calculate the "qualified level" of the word "number", the number of times Mb1 (710) the word "number" is qualified in the corpus data by a preposition ("in", etc.) is counted. For example, the expression "number in the cell" is counted in Mb1.

The number of times Mb2 (715) the word "number" is qualified in the corpus data by a present participle or past participle is counted. For example, the expression "user selected number" is counted in Mb2. The number of times Mb3 (720) the word "number" is qualified in the corpus data by a noun adjunct is counted. For example, the expression "customer number" is counted in Mb3. The word "number" in all other qualification patterns (including the unqualified use of the word "number") is counted in Mb4 (725).

In the embodiment of the present invention, the "qualified level S1" is calculated in accordance with the following equation on the basis of M, Mb1, Mb2 and Mb3 counted in the manner described below.

Qualified Level $S1=(Mb1+Mb2+Mb3)/M$

In a further embodiment of the present invention, in order to calculate the "qualifying level" of the word "number", the number of times Ma1 (730) the word "number" qualifies another word in the corpus data via a preposition ("of", etc.) is counted. For example, the expression "digit of number" is counted in Ma1. Also, the number of times Ma2 (735) the word "number" qualifies another noun in the corpus data via a noun adjunct of the word "number" and another noun is counted. For example, the expression "number information" is counted in Ma2. All other qualification patterns with the word "number" (including situations in which the word "number" does not qualify another word) is counted in Ma3 (740).

In a further embodiment of the present invention, the "qualifying level S2" is calculated in accordance with the following equation on the basis of M, Ma1 and Ma2 counted in the manner described below.

Qualifying Level $S2=(Ma1+Ma2)/M$

The calculation of "qualified level" and "qualifying level" on Japanese-language and English-language corpus data in Step (340) was given above.

Returning to the explanation in reference to FIG. 3, the process advances in Step (345) where it is determined whether or not the "qualified level" and "qualification level" calculated in Step (340) meet predetermined conditions. Specifically, in the embodiment of the present invention, nouns (Ns1) whose "qualified level" exceeds a predetermined threshold value (for example, 0.7) are identified. Furthermore, nouns (Ns2) whose "qualifying level" exceeds a predetermined threshold value (for example, 0.7) are identified. The threshold values used here are not fixed, and can be changed by the user.

If it has been determined in Step (345) that the "qualified level" and the "qualifying level" have met the predetermined conditions, the process proceeds in the direction of the YES arrow to Step (350). In Step (350), the noun taken from the noun list during the current process is stored as a noun that satisfies the conditions (referred to herein as a "condition-satisfying noun") in a database, that is, the condition-satisfying noun storage unit (150), and the process proceeds to Step (355). As a result, Ns1 and Ns2 are stored in the condition-satisfying noun storage unit (150). If it has been determined in Step (345) that the "qualified level" and the "qualifying level" do not satisfy predetermined conditions, the process proceeds in the direction of the NO arrow to Step (355) where the noun is not stored in the condition-satisfying noun storage unit (150).

In Step (355), it is determined whether or not there are any unprocessed nouns in the noun list generated in Step (325). When it has been determined in Step (355) that a noun remains in the list, the process returns in the direction of the YES arrow to Step (330), and the subsequent processing is repeated. If it has been determined in Step (355) that no nouns remain, the process proceeds in the direction of the NO arrow to Step (360).

Referring to FIG. 3, in Step (360), the terms related to the nouns satisfying the predetermined conditions among the nouns identified as frequent terms in the project document are identified as candidates for non-self-descriptive terms. Specifically, a given term is identified as a candidate for the first type of non-self-descriptive term on condition that Ns1 stored in the condition-satisfying noun storage unit (150) is not modified by another word (referred to herein as a "beginning term" of the term) or Ns2 does not modify another word (referred to herein as an "end term" of the term). These properties are used because, when the necessity of Ns1, Ns2 being modified by another word or modifying another word is high, the probability is also high that the meaning or definition of a term related to Ns1, Ns2 will be impossible or difficult to understand from an expression using this word if Ns1, Ns2 is modified by another word or the other word is not modified. An identified candidate for a non-self-descriptive term is stored in the non-self-descriptive term storage unit (160), and the process proceeds to Step (365) where it ends.

The flowchart shown in FIG. 4 is an example of identifying non-self-descriptive terms on the basis of a CRUD verbal noun list in reference to Step (215) of FIG. 2. The process starts in Step (405). In Step (410), verbal nouns are extracted from the corpus data and a project document. Using these results, the portions in which two or more verbal nouns are linked (referred to herein as "linked verbal nouns") are extracted.

The process proceeds to Step (415) where a list of ambiguous verbal nouns is generated using the CRUD verbal noun list. The generated ambiguous verbal noun list is stored in the ambiguous verbal noun storage unit (180).

Thereafter, referring to FIG. 4, in Step (420), one noun is taken from the ambiguous verbal noun list. The process then proceeds to Step (425) where frequent terms in the project document stored in the frequent term storage unit 125 that are proper nouns, common nouns other than verbal nouns, and ambiguous verbal nouns are identified as candidates for the second type of non-self-descriptive terms. The identified candidates for non-self-descriptive terms are stored in the non-self-descriptive term storage unit (160). When CRUD verbal nouns and other verbal nouns (corresponding to the "ambiguous verbal nouns") are used together in this identification process, specific actions tend to represent CRUD verbal nouns, and other verbal nouns tend to merely represent abstract actions. The properties of these results are used because terms consisting of proper nouns, common nouns other than verbal nouns, and ambiguous verbal nouns do not represent specific actions, and there is a high probability that the meaning or definition of these terms will be impossible or difficult to understand from expressions using these terms.

Referring to FIG. 4, in Step (430), the process determines whether or not there are any more unprocessed verbal nouns in the ambiguous verbal noun list generated in Step (415). When it has been determined in Step (415) that a noun remains in the list, the process returns in the direction of the YES arrow to Step (420), and the subsequent processing is repeated. When it has been determined in Step (430) that no nouns remain, the process proceeds in the direction of the NO arrow to Step (435) where the process ends (440).

Figure 8:
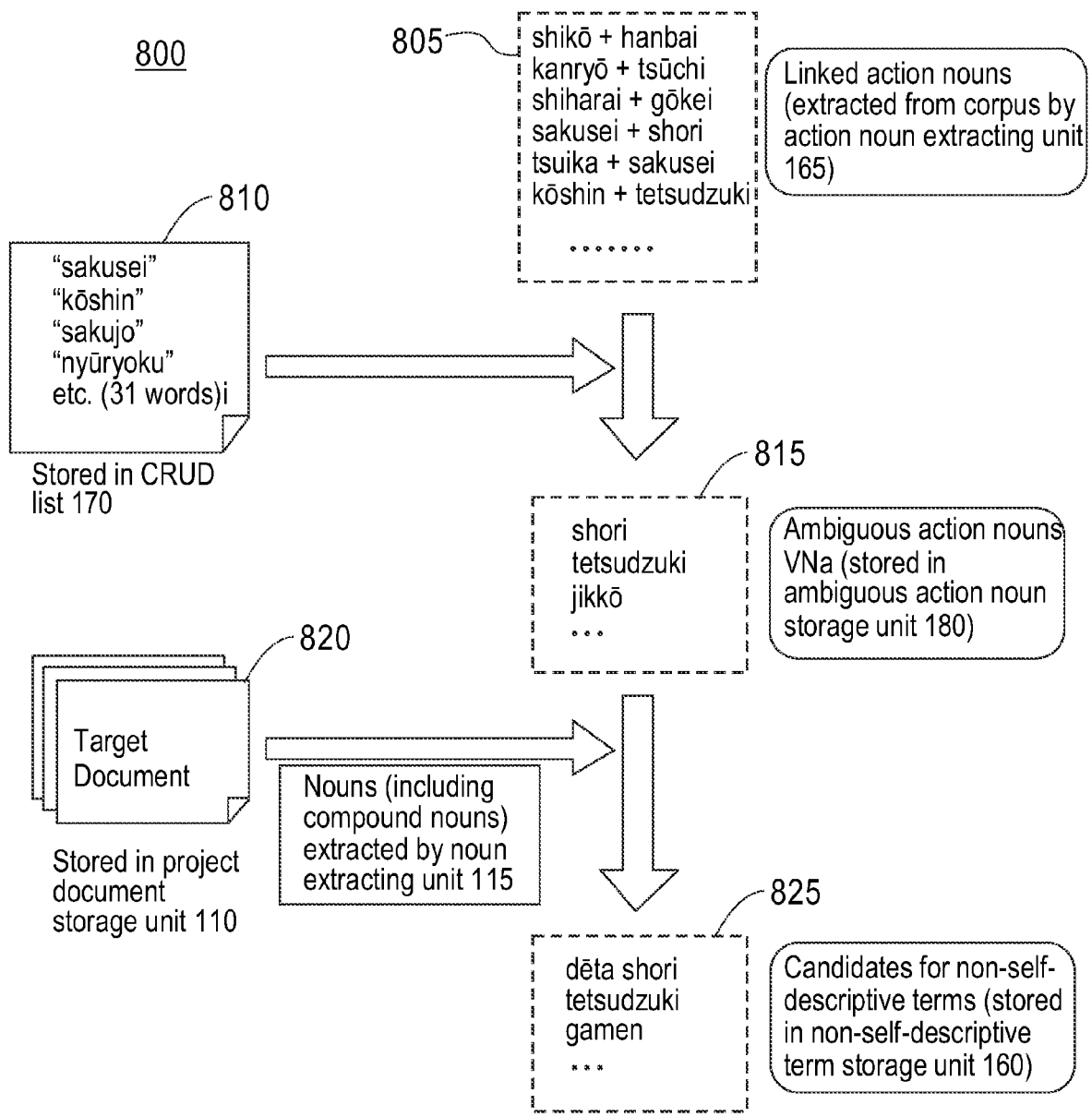
FIG. 8 is a diagram used to explain the process for qualification data when Japanese-language corpus data, project documentation and a CRUD verbal noun list are used in a further embodiment of the present invention.

FIG. 8 is a specific example of data modification processing (800) performed according to the flowchart in reference to FIG. 2 (215) using Japanese-language corpus data, project documentation and CRUD verbal noun lists. In this example, linked verbal nouns (805) including "shikō hanbai", "kanryō tsūchi", "shiharai gōkei", "sakusei shori", "tsuika sakusei" and "kōshin tetsudzuki" are extracted from the corpus data in Step (410). In Step (415), identified as ambiguous verbal nouns (815) are the verbal nouns included among the verbal nouns (805) extracted in Step (410) including verbal nouns (810) related to CRUD such as "sakusei", "kōshin", "sakujo" and "nyūryoku" included in the CRUD verbal noun list (170). In this example, "shori", "tsuika" and "tetsudzuki" included among "sakusei shori", "tsuika sakusei" and "kōshin tetsudzuki" are identified as ambiguous verbal nouns. Then, in Step (425), "dēta shori" and "tetsudzuki gamen" including the ambiguous verbal nouns "shori", "tsuika" and "tetsudzuki" are identified as candidates for non-self-descriptive terms (825) from among the frequent terms extracted from a project document (820) stored in the project document storage unit (110).

Figure 9:
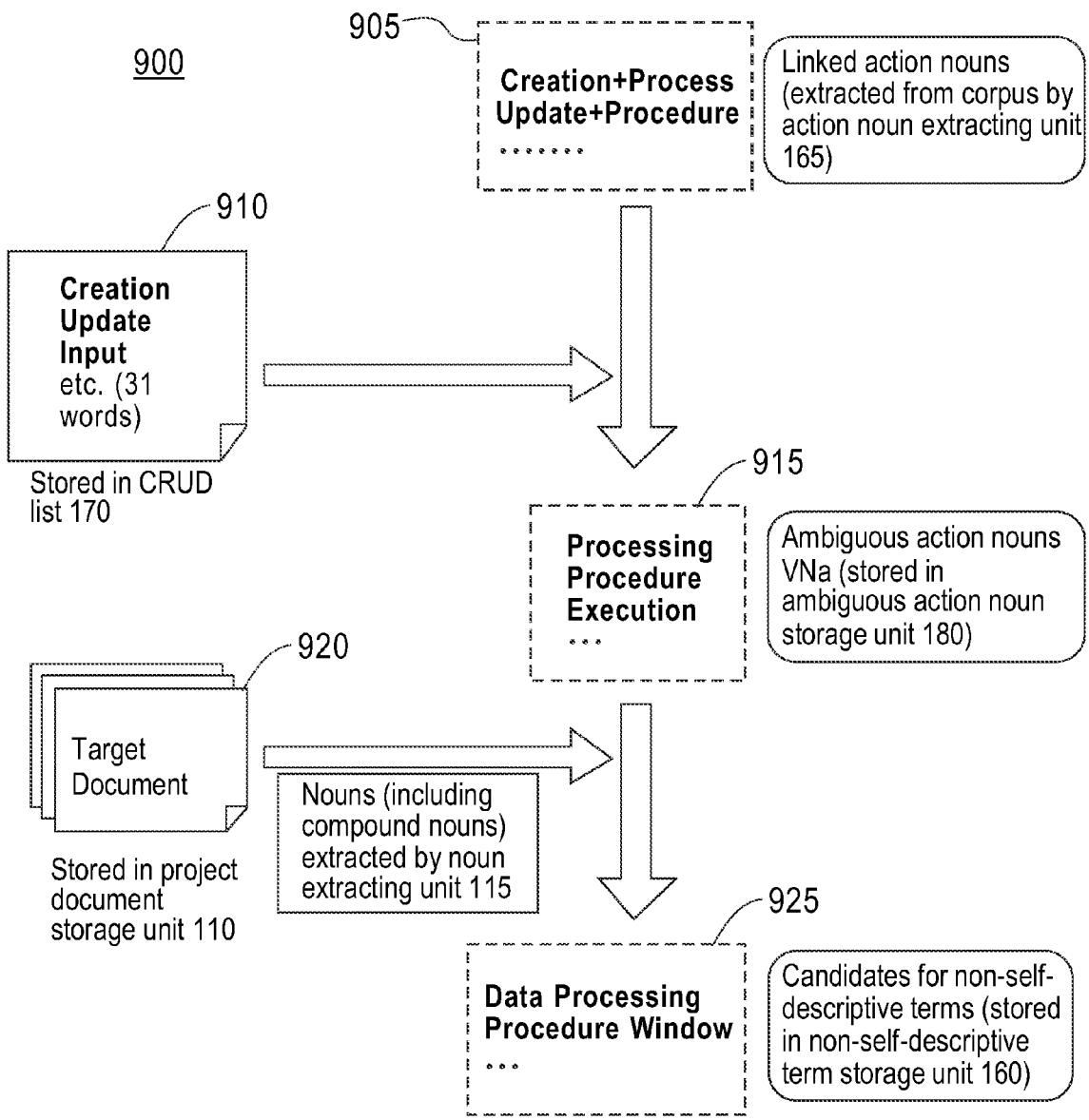
FIG. 9 is a diagram used to explain the process for qualification data when English-language corpus data, project documentation and a CRUD verbal noun list are used in a further embodiment of the present invention.

FIG. 9 is a specific example of data modification processing (900) performed according to the flowchart (215) in reference to FIG. 2, using English-language corpus data, project documentation and CRUD verbal noun lists. In this example, linked verbal nouns (905) including "creation processing" and "update procedure" are extracted from the corpus data in Step (410). In Step (415), identified as ambiguous verbal nouns (915) are the verbal nouns included among the verbal nouns (905) extracted in Step (410) including verbal nouns (810) related to CRUD such as "creation", "read", "update" and "delete" included in the CRUD verbal noun list (910) (170). In this example, "processing" and "procedure" included among "creation processing" and "update procedure" are identified as ambiguous verbal nouns. Then, in Step (425), "data processing" and "procedure window" including the ambiguous verbal nouns "processing" and "procedure" are identified as candidates for non-self-descriptive terms (925) from among the frequent terms extracted from a project document (920) stored in the project document storage unit (110).

Figure 5:
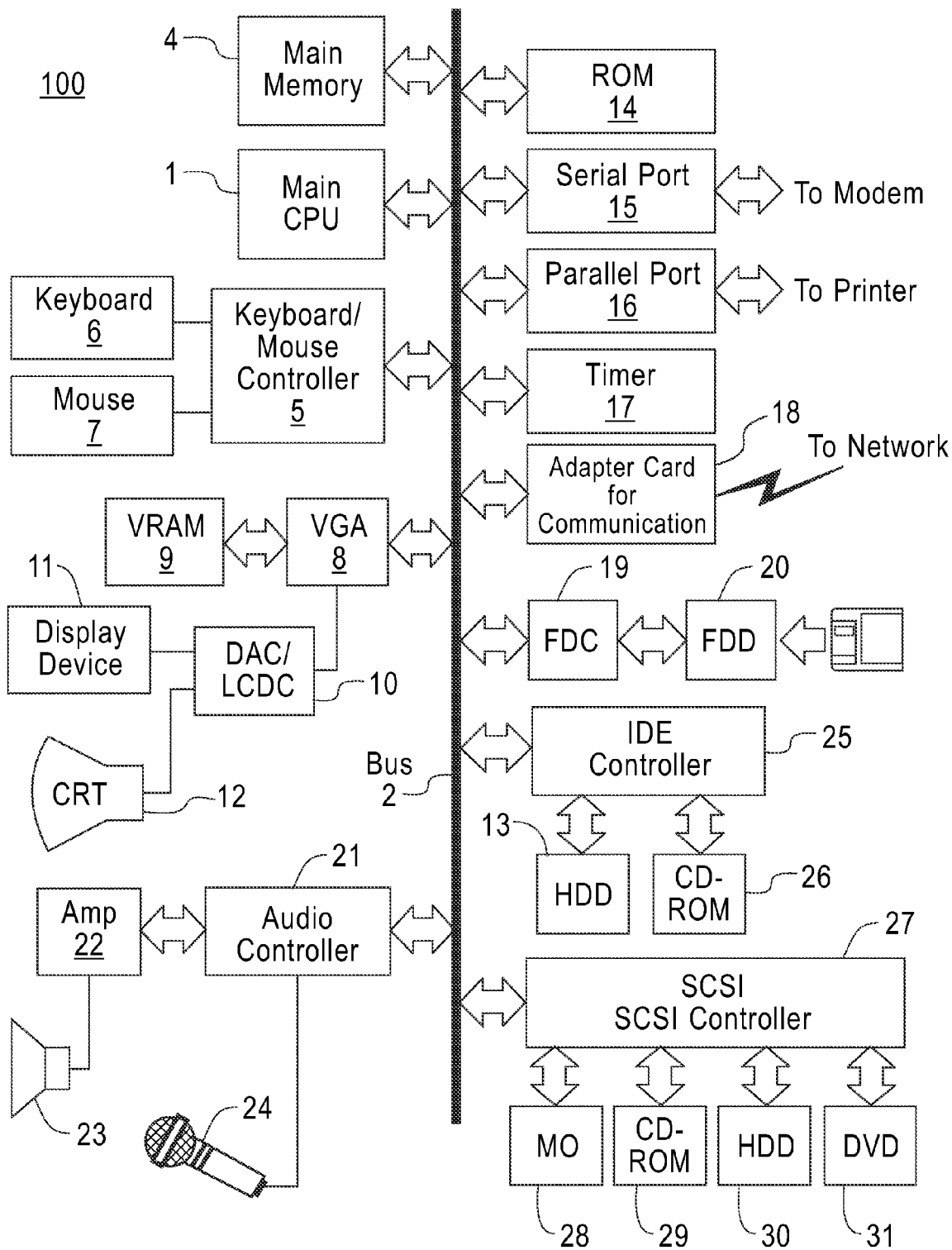
FIG. 5 is a diagram showing an example of a preferred hardware configuration for an information processing device embodying the document processing system in a further embodiment of the present invention.

FIG. 5 is a diagram showing an example of a preferred hardware configuration for an information processing device embodying the document processing system in the embodiment of the present invention. The data processing device includes a central processing unit (CPU) 1 and a main memory 4 connected to a bus 2. Hard disk drives 13, 30, CD-ROM devices 26, 29, a floppy disk drive 20, an MO device 28, a DVD device 31 and other types of readable storage (external storage systems with replaceable recording media) are connected to the bus 2 via a floppy disk controller 19, IDE controller 25, and SCSI controller 27, etc.

Floppy disks, MO, CD-ROM, DVD-ROM and other storage media are inserted in the readable storage. These storage media, the hard disk drives 13, 30, and the ROM 14 can record computer program code which works with the operating system to issue instructions to the CPU etc. and embody the present invention. The computer program is loaded into the main memory 4 and executed. The computer program can also be compressed, divided into more than one program, and recorded on a plurality of media.

The information processing device receives input from input devices such as a keyboard 6 and mouse 7 via the keyboard/mouse controller 5. The information processing device is connected via the VGA 8 to the DAC/LCDC 10 to a display device 11 for presenting visual data to the user. The DAC/LCDC 10 is also connected to the display device which is a cathode ray tube CRT 12. The VGA 8 is connected to the storage medium VRAM 9. Furthermore, the information processing device is connected via audio controller 21 to audio outputs, such as, an amplifier 22 connected to a speaker 23 and/or microphones 24, for providing audio data to the user.

The information processing device can be connected to a network via a network adapter 18 (Ethernet®, etc.) to exchange data with another computer. The information processing device can be connected to a printer via a parallel port 16 or connected to a modem via a serial port 15, and furthermore, it can connected to a timer 17.

From this description, it should be clear that the data processing system in the embodiment of the present invention can be realized by an information processor such as an ordinary personal computer, workstation or main frame, or a combination thereof. The configuration elements described are illustrative, and all of the configuration elements are not to be considered essential configuration elements of the present invention.

It should also be clear that an ordinary person skilled in the art could conceive of various changes such as combining a plurality of machines and allocating functions to these machines to embody the hardware configuration elements of the information processing device used in the embodiment of the present invention. These changes are naturally included in the concept of the present invention.

The data processing system in the embodiment of the present invention uses an operating system that supports a graphical user interface (GUI) multi-window environment. Examples include the Windows® operating system from Microsoft Corporation, MacOS® from Apple Computer Incorporated, and UNIX®-based systems (for example, AIX® from International Business Machines Corporation).

It should also be clear that the data processing system used in the embodiment of the present invention is not limited to a specific multi-window operation system environment.

The present invention can be realized by hardware, software, or a combination of hardware and software. When the present invention is executed by a combination of hardware and software, it is typically executed by a device in which the computer program has been installed. The computer program is downloaded to the memory of the device and executed. The computer program then controls the device and executes the processing of the present invention. This computer program can be configured from groups of instructions expressed in any language, code or notation. The device can execute the specific functions in the group of instructions immediately, or after (1) converting the group of instructions into another language, code or notation, and/or (2) copying the group of instructions to another medium.

The present invention is not just the computer program itself. A recording medium for recording the computer program is also included within the scope of the present invention. A computer program for executing the functions of the present invention can be stored on any computer-readable recording medium, including a floppy disk, MO, CD-ROM, DVD, hard disk, ROM, MRAM or RAM. The computer program can also be downloaded from another data processing system connected to a communication network for storage on a recording medium, or can be copied from another recording medium. The program can also be compressed, divided into a plurality of programs, and recorded on one or more recording media. A computer program product embodying the present invention can take a variety of forms.

It should be clear that an ordinary person skilled in the art could add various types of modifications and improvements to the present invention. For example, in the explanation of the embodiment of the present invention, it was assumed that the corpus data, project documentation and CRUD verbal noun lists were in either Japanese or English. However, the present invention can be applied to electronic documentation in other languages. In the explanation of the embodiment of the present invention, the project documents were related to an information processing system. However, it goes without saying that the present invention can be applied to electronic documents in other fields. In the explanation of the embodiment of the present invention, it was assumed that the document processing system presents candidates for non-self-descriptive terms and that a person or device eventually checks that the candidates are non-self-descriptive terms. However, it can also be assumed that the presented candidates are all non-self-descriptive terms.

In the embodiment of the present invention, 31 specific verbal nouns were used as the set of CRUD verbal nouns. However, these 31 specific verbal nouns serving as verbal nouns representing the specific actions of a system are for illustrative purposes only. A person of skill in the art naturally can change or expand this list when appropriate. Also, in the embodiment of the present invent, the target project document was separate from the corpus data. However, corpus data including the target project document can also be processed. Embodiments including these changes or improvements are naturally included within the technical scope of the present invention.

As explained above, the embodiment of the present invention can effectively identify candidates for non-self-descriptive terms included in a target electronic document.

What is claimed is:

1. A computer-implemented method for identifying a non-self-descriptive term in an electronic document, including a memory and a processor communicatively coupled to the memory, wherein the processor is configured to execute the steps of a method comprising:
   acquiring a noun included in corpus data;
   calculating a qualifying level and qualified level in the corpus data related to each noun included in the corpus data;
   identifying one or more nouns included in the corpus data having a qualifying level and/or qualified level satisfying a predetermined condition; and
   presenting a term related to one or more of the nouns in the electronic document as a candidate for the non-self-descriptive term in the electronic document, wherein the qualified level of a first noun in the, corpus data is calculated by:
   counting a number of occurrences (M) of the first noun in the corpus data;
   counting a number of times (Mb1) the first noun is qualified by a preposition in the corpus data;
   counting a number of times (Mb2) the first noun is qualified by a present of past participle in the corpus data;
   counting a number of times (Mb3) the first noun is qualified by a noun adjunct in the corpus data; and
   summing Mb1, Mb2 and Mb3 and dividing the sum by M to obtain the qualified level of the first noun in the corpus data.

2. The method of claim 1, further comprising a step for analyzing qualification relationships of each noun included in the corpus data.

3. The method of claim 2, wherein the analyzing step includes a step for identifying words qualifying and words qualified by each noun included in the corpus data.

4. The method of claim 2, further comprising:
   breaking down compound nouns included in the corpus data into simple nouns that constitute the compound nouns; and
   analyzing qualification relationships of each simple noun.

5. The method of claim 1, wherein the terms are frequent terms having a frequency of appearance in the electronic document greater than a. predetermined reference.

6. The method of claim 5, further comprising the steps of:
   calculating the frequency of appearance of a noun included in the corpus data;

calculating the frequency of appearance of a noun including in the electronic document; and identifying as a frequent term a noun if the frequency of appearance of a noun included in the electronic document is greater than the predetermined reference in comparison to the frequency of appearance of the noun in the corpus data.

7. The method of claim 5, wherein the frequency of appearance of a noun is calculated by dividing the number of appearances of a noun in the electronic document by the total number of nouns included in the electronic document.

8. The method of claim 1, wherein the qualified level of a noun is calculated by dividing the number of places the noun is qualified by other words and phrases in accordance with a predetermined pattern by a total number of appearances of the noun.

9. The method of claim 1, wherein the qualifying level of a noun is calculated by dividing the number of places the noun qualifies another word in accordance with a predetermined pattern by the total number of appearances of the noun.

10. The method of claim 1, wherein the predetermined condition is satisfied when the qualified level and the qualifying level exceed a predetermined threshold value.

11. The method of claim 1, wherein the presenting step includes a step for identifying as a candidate for the non-self-descriptive term a term which includes at least one noun as a beginning term or an end term.

12. The method of claim 1, wherein the electronic document is a project document related to an information processing system.

13. The method of claim 12, wherein the method further comprises:
acquiring a verbal noun included in the corpus data;
identifying a verbal noun included in the corpus data used on the basis of a verbal noun included in the corpus data expressing a basic action of the information processing system determined beforehand; and
identifying a term including the identified verbal noun as a non-self-descriptive term.

14. The method of claim 13, wherein the basic action of the information processing system includes CRUD (create, read, update and delete).

15. The method of claim 1, wherein the acquiring step includes a step for conducting a morphological analysis of the corpus data and extracting nouns.

16. A computer readable non-transitory article of manufacture tangibly embodying computer readable instructions which, when executed, cause a computer to carry out the steps of a method, comprising:
acquiring a noun included in corpus data;
calculating a qualifying level and qualified level in the corpus data related to each noun included in the corpus data;
identifying one or more nouns included in the corpus data having a qualifying level and/or qualified level satisfying a predetermined condition; and
presenting a term related to one or more of the nouns in the electronic document as a candidate for the non-self-descriptive term in the electronic document, wherein the qualified level of a first noun in the corpus data is calculated by:
counting a number of occurrences (M) of the first noun in the corpus data;
counting a number of times (Mb1) the first noun is qualified by a preposition in the corpus data;
counting a number of times (Mb2) the first noun is qualified by a present or past participle in the corpus data;
counting a number of times (Mb3) the first noun is qualified by a noun adjunct in the corpus data; and
summing Mb1, Mb2 and Mb3 and dividing, the sum by M to obtain the qualified level of the first noun in the corpus data.

17. A document processing system for identifying non-self-descriptive terms in an electronic document comprising:
a memory;
a processor communicatively coupled to the memory; and
a noun extraction unit for acquiring a noun included in corpus data;
a qualification relationship analysis unit for calculating a qualifying level and a qualified level in the corpus data related to each noun that is included in the corpus data;
a condition determining unit for identifying one or more nouns included in the corpus data having as qualifying level and/or qualified level satisfying a predetermined condition; and
an information processing unit for presenting a term related to one or more of the nouns in the electronic document as a candidate for the non-self-descriptive term included in the electronic document, wherein the qualified level of a first noun in the corpus data is calculated by:
counting a number of occurrences (M) of the first noun in the corpus data;
counting a number of times (Mb1) the first noun is qualified by a preposition in the corpus data;
counting a number of times (Mb2) the first noun is qualified by a present or past participle in the corpus data;
counting a number of times (Mb3) the first noun is qualified by a noun adjunct in the corpus data;
summing mb1, Mb2 and Mb3 and dividing the sum by M to obtain the qualified level of the first noun in the corpus data.

* * * * *